Dec. 28, 1926.
S. NOMURA
DRAFT INDICATING APPARATUS
Filed March 29, 1924
1,612,308
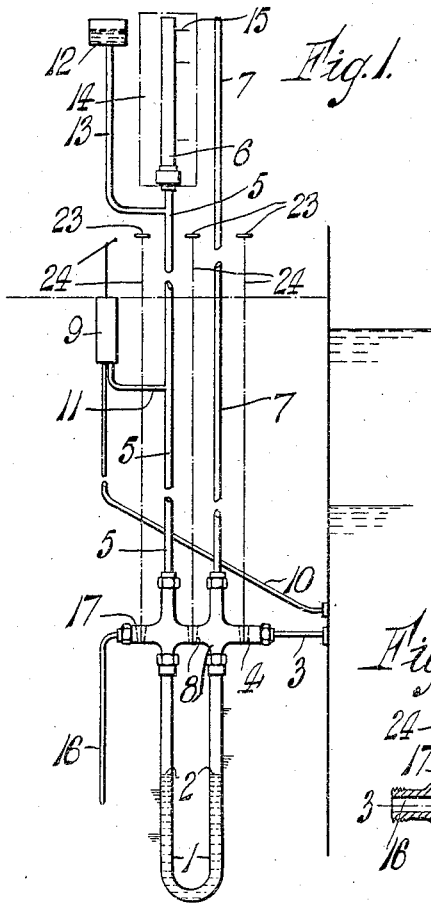
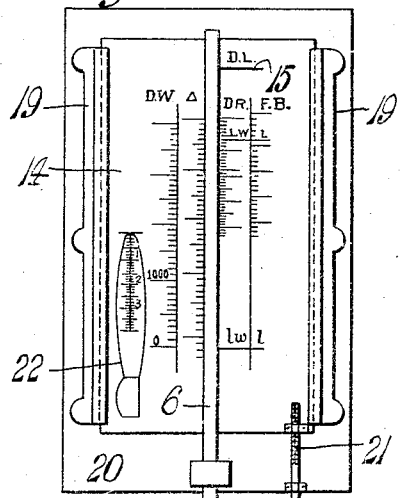
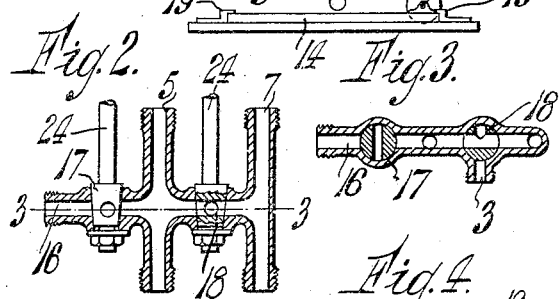
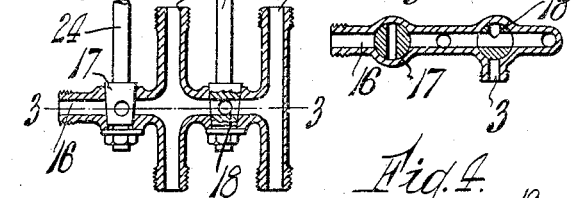
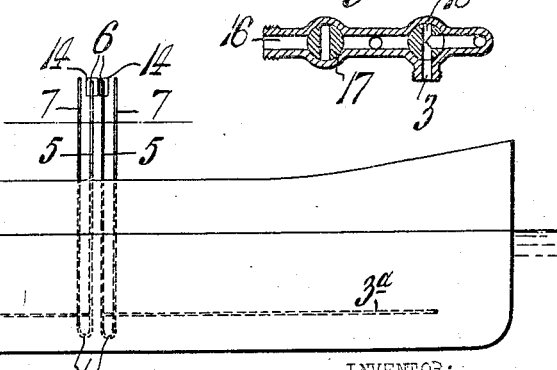
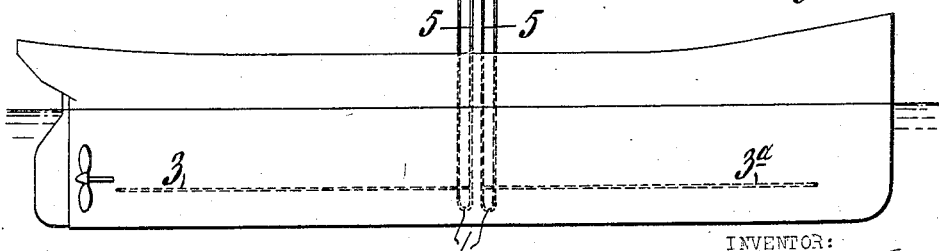
INVENTOR:
SEIGO NOMURA
By his Attorneys, Patented Dec. 28, 1926.

1,612,308

UNITED STATES PATENT OFFICE.

SEIGO NOMURA, OF CHELSEA, LONDON, ENGLAND.

DRAFT-INDICATING APPARATUS.

Application filed March 29, 1924, Serial No. 702,816, and in Great Britain January 7, 1924.

This invention relates to apparatus by means of which the draft of a floating structure, such as a ship, floating dock or the like, can be ascertained and more specifically to improvements in apparatus in which a U tube containing mercury is located below the level of the water in which the structure is floating, one leg of the U tube being connected by a pipe to the water.

According to one feature of my invention, that leg of the U tube which is not connected to the sea or other water in which the structure is floating is connected by the main pipe to a gauge glass so that this latter can be located about the ship's deck (if the floating structure be a ship) or in any convenient position.

Preferably that leg of the U tube which is connected to the sea is provided with a cock so that it can be disconnected therefrom and is also connected to a branch pipe which rises to the level of the top of the gauge glass.

Preferably also the two legs of the U tube are connected by a cock, and the cock may be provided for drawing off water from the pipe connecting the gauge glass to the U tube to facilitate the setting of the apparatus.

In order to prepare the apparatus for use, the cock controlling the connection between the leg of the U tube and the sea, is closed and the cock connecting the two legs of the U tube opened. The main and branch pipes are then filled with sea water (or fresh water if the ship be in fresh water) up to a definite level line marked on the gauge scale. The cock controlling the connection between the leg of the U tube and the sea is then opened, and the cock connecting the two legs of the U tube closed.

Preferably the scale is also marked to indicate displacement, freeboard and dead weight as in an ordinary dead weight scale and also draft, light draft and load draft so that the displacement, freeboard and dead weight and the draft at respective loaded conditions of the ship can readily be read.

It may be pointed out that though the difference between the head of water inboard and outboard is large the movement of the water in the gauge glass is considerably lessened owing to the specific gravity of the mercury, and in order still further to reduce the movement of the water in the gauge glass the main pipe previously referred to may, according to another feature of my invention, be connected to a pipe the bore of which is such as to produce the desired lessening of the movement of the water in the glass. This pipe may, according to a certain feature of my invention, be connected to a tank the bottom of which is slightly above the definite level line, this tank serving to enable the level of the water in the gauge glass to be more readily set to the definite level line. Or the gauge glass itself may, if desired, be connected to a water tank with the same object.

The cock for controlling the connection between the leg of the U tube and the sea may conveniently be provided with means by which it can be controlled from the gauge glass platform so that the cock can be closed if desired, for example, when the boat is under way or during rough weather or when it is not desired to use the apparatus or for repairs, in addition to the use already referred to, that is, the filling of the main and branch pipes up to a definite level on the gauge glass scale.

Preferably I provide a hand or other pump by means of which the water can be drawn from the sea (or other water in which the ship is sailing) to fill the main and branch pipes to the definite level, and preferably the main pipe is provided with a cock by means of which the water therein can be drained off either to adjust the height of the water therein or to empty it.

If it be desired to indicate the draft at each end of the ship I provide a pair of U tubes and gauge glasses, the connection from one leg of one tube to the sea being at one end of the ship and the other connection at the other end of the ship, and I may conveniently locate the two gauge glasses side by side amidships. That gauge glass which is connected to the sea at the stern of the ship may conveniently have provided on its scale an outline of the ship's propeller, this indicating how much the propeller (if at all) is above water when the ship is unladen.

Any suitable means may be provided for controlling the connection between the leg of the U tube and the sea, and a connection between the two legs of the U tube; for example, these two may be controlled by a three way cock.

The apparatus may also be simplified by omitting the branch pipe; this, however, in addition to affording a ready means for obtaining the definite level previously referred to, also serves a useful purpose in that it allows of the escape of any air bubbles which come in with the sea water.

Preferably the gauge glass scale is slidably mounted and provided with a vernier or other screw adjustment or with a rack and pinion in order to enable the definite level to be more readily and accurately adjusted.

The accompanying drawing shows diagrammatically how the invention can be carried into effect.

Figure 1 is a diagram of the whole arrangement, Figure 2 is a detail section to a larger scale, Figure 3 is a section on the line 3—3, Figure 2, Figure 4 is a similar section with the sea cock in a different position, Figure 5 is a detail view to a larger scale, Figure 6 is an end view of Figure 5, and Figure 7 is a diagrammatic view of a modification.

Referring more particularly to Figure 1, 1 is a U tube which is filled with mercury to the height 2. One leg of the U tube is connected to the sea by a pipe 3. 4 is a cock by means of which the connection to the sea can be shut off or opened. The other leg of the U tube 1 is provided with a main pipe 5 extending upwardly to a gauge glass 6 situated on the bridge of the ship (not shown). That leg of the U tube which is connected to the sea is also provided with a branch pipe 7 which rises to the level of the top of the gauge glass 6. 8 is a cock connecting the legs of the U tube. 9 is a hand pump by means of which water can be drawn from the sea through a pipe 10 and delivered into the main pipe 5 through a pipe 11. 12 is a water tank which enables the level of liquid in the gauge glass to be more readily set to a definite level. 13 is a pipe connecting the tank 12 to the main pipe 5. The bore of the tube 13 is such as to reduce the movement of liquid in the gauge glass 6 to the desired amount. 14 is a scale marked with a definite level line 15 and preferably also marked so as to indicate, for example, displacement, freeboard and dead weight as in an ordinary dead weight scale, and also draft, light draft and load draft, so that the displacement, freeboard and dead-weight and the draft at respective loaded conditions of the ship, can readily be read.

16 is a drain pipe connected to the main pipe 5 through a cock 17.

23 are handles by means of which the cocks 4, 8 and 17 can be actuated through rods 24.

In operation, in order to prepare the apparatus for use the cock 4 is closed, the cock 8 is opened and the pipes 5 and 7 are filled with sea water (or fresh water if the ship be in fresh water) by the pump 9 up to (or above) the definite level line marked on the gauge scale. If the level of the water in the gauge glass is above the definite level line, it is lowered by opening the cock 17; the tank 12 causes the liquid to descend slowly and facilitates the accurate setting to the definite level line. The cock 8 is then closed and the cock 4 opened.

Should it be desired to lower the level of the water in the gauge glass, this can be effected by opening the cock 17.

Referring now to Figures 2, 3 and 4, 18 is a cock by means of which the connection to the sea through the pipe 3 can be cut off and allow for a passage between the legs of the U tube 1, as shown in Figures 2 and 3, or can be turned to the position so as to put one leg of the U tube in connection with the sea through the pipe 3, as shown in Figure 4, the cock 18 thus taking the place of the cocks 4 and 8.

Figures 5 and 6 show a scale suitable for use with the arrangement shown in Figure 1. The scale 14 is mounted to slide in guides 19 on a base 20. 21 is a threaded rod by means of which the scale 14 can be moved up and down and accurately set. 22 is a representation of one half of the ship's screw which is drawn to scale and indicates how much the said screw (if at all) is above the water.

Figure 7 is a diagram showing two apparatus for indicating the draft of the ship, both located on the bridge of the ship. The U tube 1 has one leg connected to the sea by a pipe 3 near to the stern of the ship whilst one leg of the other U tube 1 is connected to the sea by a pipe 3ª near to the bow.

In all cases the branch pipe 7 may be omitted in order to simplify the apparatus, but it is preferably employed as an addition for affording a ready means for attaining the definite level 15 and it also serves to allow of the escape of air bubbles entering with the water through the pipe 3.

What I claim is:—

1. In means for indicating the draft of a floating structure, the combination of a U-tube, a pipe connecting one arm of the U tube to the water in which the structure is floating, a gauge glass, an upwardly extending pipe connecting the other leg of the U tube to the gauge glass and filled with liquid and means for reducing the movement of the liquid in the gauge glass.

2. In means for indicating the draft of a floating structure, the combination of a U-tube, mercury filling the lower end of said U-tube, a pipe connecting one arm of the U-tube to the water in which the structure is floating, a gauge glass, an upwardly extending pipe connecting the other leg of the U-tube to the gauge glass and filled with liquid and means for reducing the movement of the liquid in the gauge-glass.

3. An arangement as claimed in claim 1 in which additional means for reducing the movement of the liquid in the gauge glass is employed.

4. The combination with an arrangement as claimed in claim 1, of a tank and means connecting the tank to the pipe connecting a leg of the U tube to the gauge glass.

5. The combination with an arrangement as claimed in claim 1 of means for controlling the connection between the U tube and the water.

6. The combination with an arrangement as claimed in claim 1, of a pump for filling the pipe connecting the gauge glass to the U tube.

7. An arrangement for indicating the draft of a ship and as claimed in claim 1, in which a gauge glass connected to the water at the stern of the ship is provided with a scale drawing of the ship's screw.

8. In apparatus for indicating the draft of a floating structure, the combination of a U tube, a pipe connecting one leg of the U tube to the water in which such structure is floating, a gauge glass for indicating the draft of the structure, a pipe connecting the other leg of the U tube to the gauge glass, a scale, a definite level line on said scale, and a tank in communication with the said pipe, the said tank serving to faciltiate the setting of the level of the liquid in the gauge glass to the definite level line.

9. In apparatus for indicating the draft of a floating structure, the combination of a U tube, mercury filling the lower end of the said U tube, a pipe connecting one leg of the U tube to the water in which such structure is floating, a gauge glass for indicating the draft of the structure, a pipe connecting the other leg of the U tube to the gauge glass, and an additional pipe in communication with the said pipe serving to decrease the movement of the liquid in the gauge glass.

10. In apparatus for indicating the draft of a floating structure, the combination of a U tube, mercury filling the lower end of the said U tube, a pipe connecting one leg of the U tube to the water in which such structure is floating, a gauge glass for indicating the draft of the structure, a pipe connecting the other leg of the U tube to the gauge glass, a scale, a definite level line on said scale, and a tank in communication with the said pipe, the said tank serving to facilitate the setting of the level of the liquid in the gauge glass to the definite level line.

In testimony that I claim the foregoing as my invention I have signed my name this 13th day of March, 1924.

SEIGO NOMURA.